US011328379B2

(12) United States Patent
Furukawa et al.

(10) Patent No.: US 11,328,379 B2
(45) Date of Patent: May 10, 2022

(54) IMAGE PROCESSING APPARATUS AND IMAGE PROCESSING METHOD

(71) Applicant: SONY CORPORATION, Tokyo (JP)

(72) Inventors: Kendai Furukawa, Tokyo (JP); Junichi Tanaka, Kanagawa (JP); Yuichi Araki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/331,379

(22) PCT Filed: Sep. 29, 2017

(86) PCT No.: PCT/JP2017/035397
§ 371 (c)(1),
(2) Date: Mar. 7, 2019

(87) PCT Pub. No.: WO2018/070266
PCT Pub. Date: Apr. 19, 2018

(65) Prior Publication Data
US 2019/0206014 A1 Jul. 4, 2019

(30) Foreign Application Priority Data
Oct. 13, 2016 (JP) .............................. JP2016-201469

(51) Int. Cl.
*G06T 15/00* (2011.01)
*G06T 13/20* (2011.01)
(Continued)

(52) U.S. Cl.
CPC .............. *G06T 1/0007* (2013.01); *G06T 7/00* (2013.01); *G06T 13/20* (2013.01); *G06T 15/00* (2013.01);
(Continued)

(58) Field of Classification Search
None
See application file for complete search history.

(56) References Cited

U.S. PATENT DOCUMENTS 6,384,846 B1 * 5/2002 Hiroi ........................ G09G 5/14
345/619
2011/0150101 A1 * 6/2011 Liu ........................ H04N 13/246
375/240.26
(Continued)

FOREIGN PATENT DOCUMENTS

| JP | H10-255072 A | 9/1998 |
| JP | 2000-322576 A | 11/2000 |
| JP | 2004-537082 A | 12/2004 |

OTHER PUBLICATIONS

Moezzi et al., Virtual View Generation for 3D Digital Video, Immersive Telepresence, IEEE MultiMedia, Jan.-Mar. 1997, pp. 18-26, IEEE.
(Continued)

*Primary Examiner* — Kyle Zhai
(74) *Attorney, Agent, or Firm* — Paratus Law Group, PLLC

(57) ABSTRACT

There is provided an image processing apparatus and an image processing method that enable selection of viewpoints of depth images suitable for creation of a 3D model. A viewpoint determination unit determines that a candidate viewpoint be a viewpoint of a depth image of a 3D model on the basis of the 3D model projected on a screen from the candidate viewpoint. The present disclosure can be applied to, for example, an encoding device or the like that generates and encodes color images and depth images from predetermined viewpoints, from color images and depth images from a plurality of viewpoints of a 3D model of a subject.

5 Claims, 11 Drawing Sheets

(51) Int. Cl.
    *G06T 17/00*  (2006.01)
    *G06T 1/00*   (2006.01)
    *G06T 7/00*   (2017.01)
    *G06T 19/00*  (2011.01)
    *B60R 1/00*   (2022.01)

(52) U.S. Cl.
    CPC .............. *G06T 17/00* (2013.01); *G06T 19/00* (2013.01); *B60R 1/00* (2013.01)

(56) References Cited

U.S. PATENT DOCUMENTS

| | | | | |
|---|---|---|---|---|
| 2012/0050478 A1* | 3/2012 | Karaoguz | ............ | H04N 13/111 348/46 |
| 2013/0135315 A1* | 5/2013 | Bares | ................ | G11B 27/031 345/473 |
| 2015/0215600 A1* | 7/2015 | Norkin | ................ | H04N 13/111 348/43 |

OTHER PUBLICATIONS

Dec. 19, 2019, European Search Report issued for related EP Application No. 17860598.6.

Sep. 18, 2019, European Search Report issued for related EP Application No. 17860598.6.

Trapp et al., Efficient Representation of Layered Depth Images for Real-time Volumetric Tests, EG UK Theory and Practice of Computer Graphics, 2008, pp. 9-16, Manchester, United Kingdom.

Smolic, 3D Video and free viewpoint video—From capture to display, Pattern Recognition, Sep. 2010, pp. 1958-1968, vol. 44, Issue 9.

Wohlkinger et al., Shape-Based Depth Image to 3D Model Matching and Classification with Inter-View Similarity, IEEE/RSJ International Conference on Intelligent Robots and Systems, Sep. 25-30, 2011, pp. 4865-4870, IEEE, San Francisco, CA.

* cited by examiner

FIG. 4

| CAMERA ID | ROTATION MATRIX R | POSITION VECTOR T |
|---|---|---|
| 1 | R1 | T1 |
| 2 | R2 | T2 |
| ⋮ | ⋮ | ⋮ | ions
IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2017/035397 (filed on Sep. 29, 2017) under 35 U.S.C. § 371, which claims priority to Japanese Patent Application No. 2016-201469 (filed on Oct. 13, 2016), which are all hereby incorporated by reference in their entirety.

TECHNICAL FIELD

The present disclosure relates to an image processing apparatus and an image processing method, and particularly, to an image processing apparatus and an image processing method that enable selection of viewpoints of depth images suitable for creation of a 3D model.

BACKGROUND ART

There is a technique for creating a 3D model of a subject from color images and depth images captured by a plurality of cameras (see, for example, Non Patent Document 1).

CITATION LIST

Non Patent Document

Non Patent Document 1: Saied Moezzi, Li-Cheng Tai, Philippe Gerard, "Virtual View Generation for 3D Digital Video," University of California, San Diego

SUMMARY OF THE INVENTION

Problems to be Solved by the Invention

However, the idea of selecting viewpoints suitable for creation of a 3D model as viewpoints of depth images to be used for creating the 3D model, has not been general. Therefore, there are cases where the speed of creating a 3D model decreases as a result of creating the 3D model by use of, for example, a depth image from a redundant viewpoint or a depth image from a viewpoint of low importance.

The present disclosure has been made in view of such a situation, and is intended to enable selection of viewpoints of depth images suitable for creation of a 3D model.

Solutions to Problems

An image processing apparatus according to a first aspect of the present disclosure includes a viewpoint determination unit that determines that a candidate viewpoint be a viewpoint of a depth image of a 3D model on the basis of the 3D model projected on a screen from the candidate viewpoint.

An image processing method according to the first aspect of the present disclosure corresponds to the image processing apparatus according to the first aspect of the present disclosure.

In the first aspect of the present disclosure, it is determined that a candidate viewpoint be a viewpoint of a depth image of a 3D model on the basis of the 3D model projected on a screen from the candidate viewpoint.

An image processing apparatus according to a second aspect of the present disclosure includes: a selection unit that selects a depth image from a predetermined viewpoint, from among depth images from a plurality of viewpoints of a 3D model, on the basis of a viewpoint of a display image; and a generation unit that generates the display image by using the depth image from the predetermined viewpoint, selected by the selection unit, and a color image of the 3D model.

An image processing method according to the second aspect of the present disclosure corresponds to the image processing apparatus according to the second aspect of the present disclosure.

In the second aspect of the present disclosure, a depth image from a predetermined viewpoint is selected from among depth images from a plurality of viewpoints of a 3D model on the basis of a viewpoint of a display image, and the display image is generated by use of the selected depth image from the predetermined viewpoint and a color image of the 3D model.

Note that it is possible to implement the image processing apparatuses according to the first aspect and the second aspect by causing computers to execute programs.

Furthermore, it is possible to provide the programs to be executed by computers so as to implement the image processing apparatuses according to the first aspect and the second aspect, by transmitting the programs via transmission media, or by recording the programs on recording media.

Effects of the Invention

According to the first and second aspects of the present disclosure, it is possible to select viewpoints of depth images suitable for creation of a 3D model.

Note that effects to be achieved are not necessarily limited to those described here, and may be any of effects described in the present disclosure.

BRIEF DESCRIPTION OF DRAWINGS

FIG. 4 is a diagram showing a configuration example of external parameters included in virtual viewpoint information.

MODE FOR CARRYING OUT THE INVENTION

Modes for carrying out the present disclosure (hereinafter referred to as embodiments) will be described below. Note that description will be provided in the following order.

Figure 10:
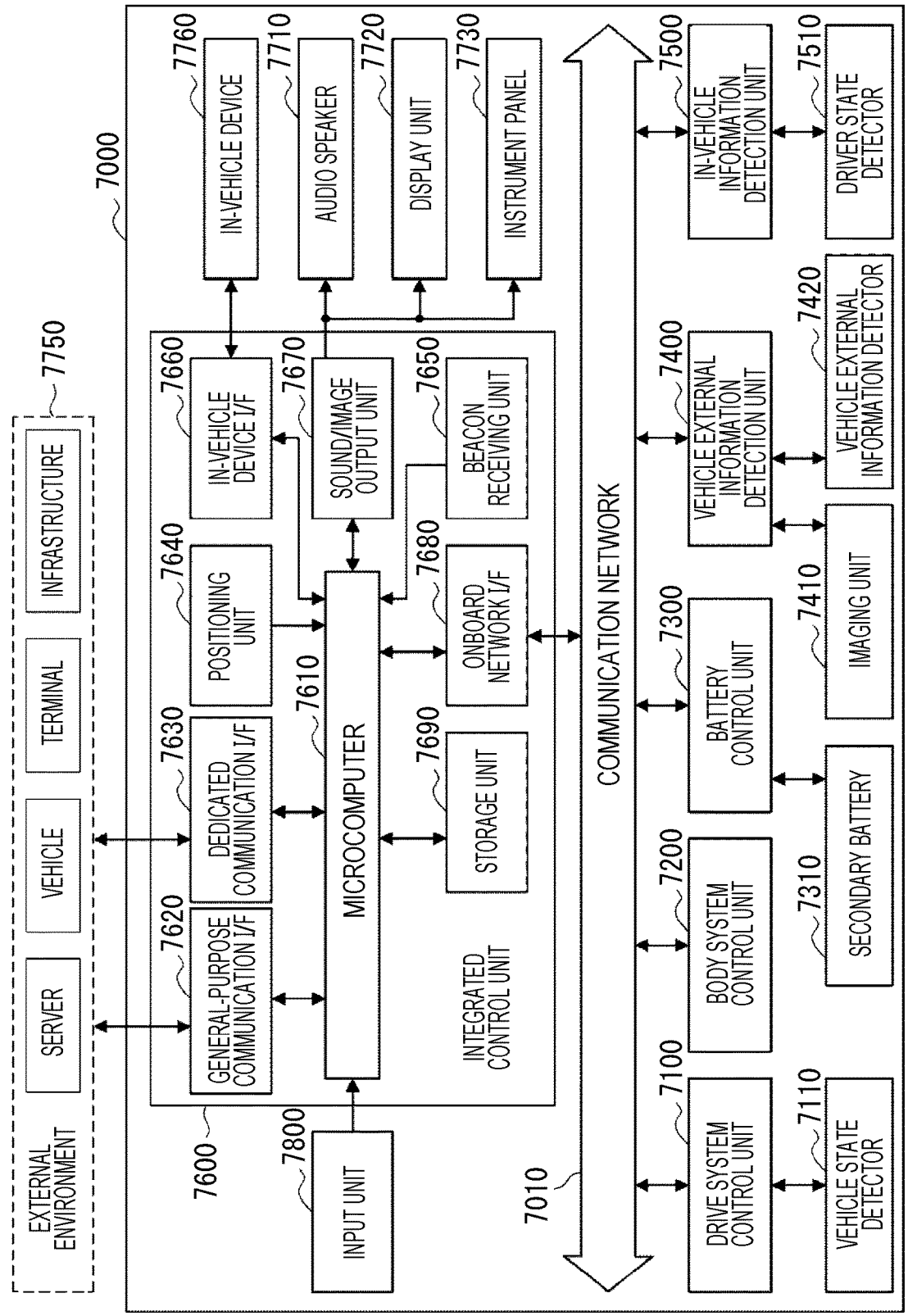
FIG. 10 is a block diagram showing an example of a schematic configuration of a vehicle control system.
Figure 11:
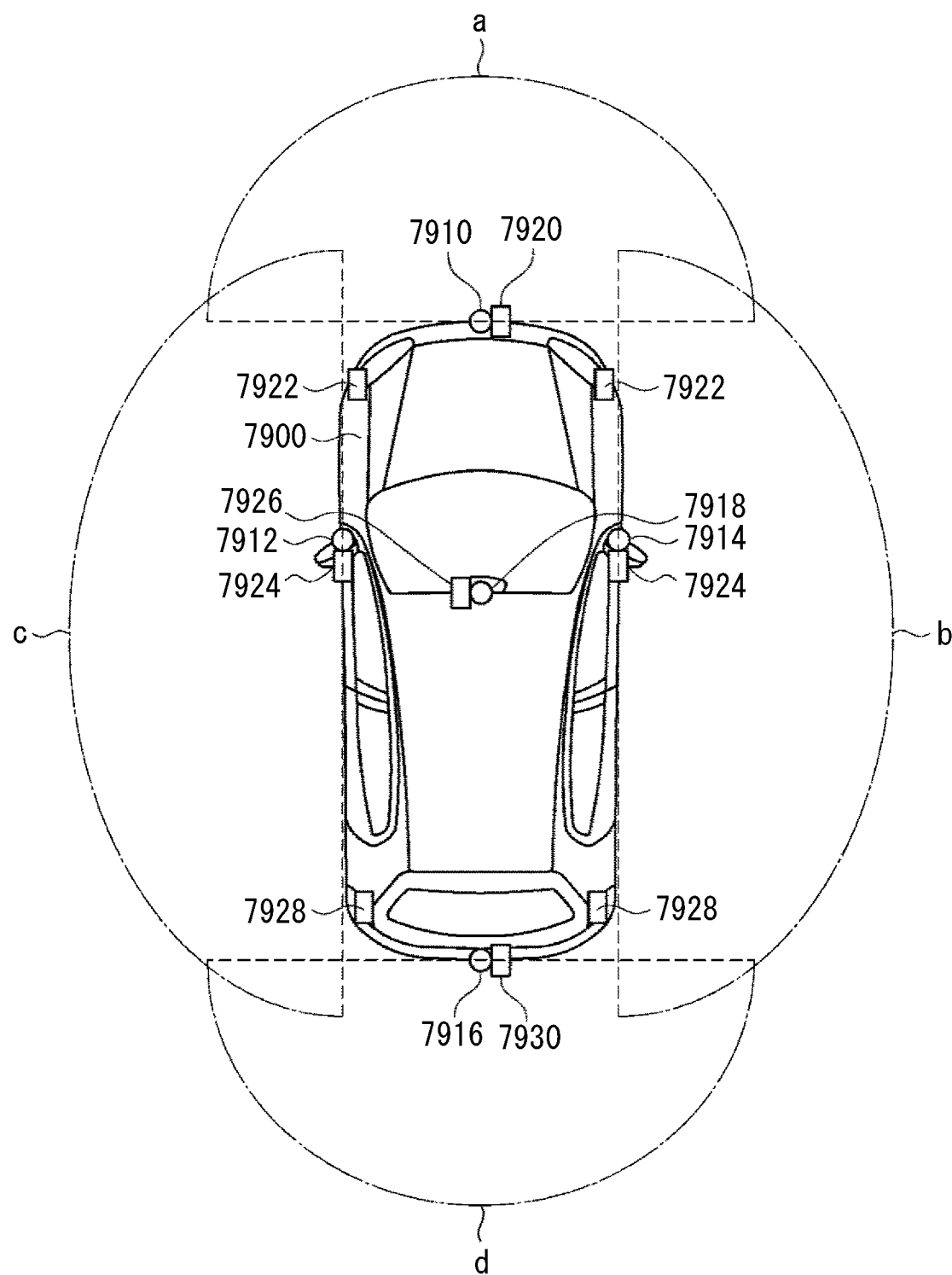
FIG. 11 is an explanatory diagram showing an example of installation positions of vehicle external information detectors and imaging units.

1. First Embodiment: Image Processing System (FIGS. 1 to 8)
2. Second Embodiment: Computer (FIG. 9)
3. Application Example (FIGS. 10 and 11)

First Embodiment (Configuration Example of First Embodiment of Image Processing System)

Figure 1:
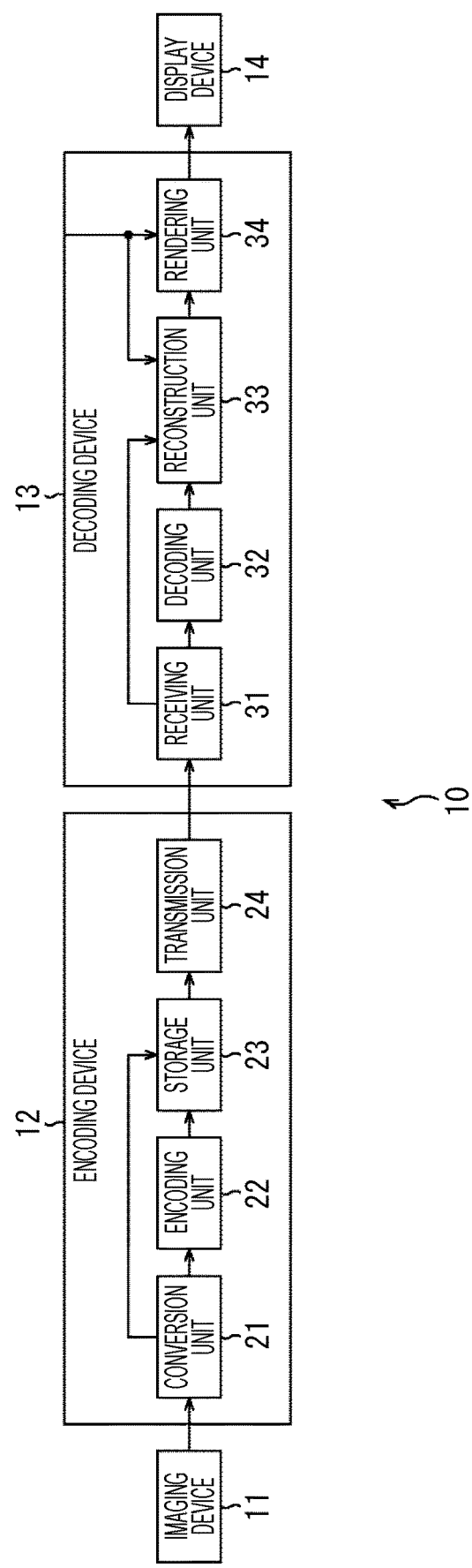
FIG. 1 is a block diagram showing a configuration example of a first embodiment of an image processing system to which the present disclosure has been applied.

FIG. 1 is a block diagram showing a configuration example of a first embodiment of an image processing system to which the present disclosure has been applied.

An image processing system 10 in FIG. 1 includes an imaging device 11, an encoding device 12 (image processing apparatus), a decoding device 13 (image processing apparatus), and a display device 14. The image processing system 10 generates and displays a color image from a display viewpoint by using a color image and a depth image obtained by the imaging device 11.

Specifically, the imaging device 11 of the image processing system 10 includes, for example, a multi-camera, a distance measuring instrument, and an image processing unit. The multi-camera of the imaging device 11 includes a plurality of cameras. Each camera captures an image sequence of color images of a subject, at least a part of which is common to each camera. For example, the distance measuring instrument is provided to each camera, and generates an image sequence of depth images from the same viewpoint as the camera.

The image processing unit of the imaging device 11 creates a 3D model of the subject by calculating a visual hull and the like frame by frame by use of the image sequences of color images and depth images of each camera, and an external parameter and an internal parameter of each camera. The image processing unit generates, as 3D data of the subject, geometry information indicating three-dimensional positions of vertexes and connections between the vertexes of each polygon mesh forming the 3D model, and color information of each polygon mesh. Note that the 3D data may include the geometry information and a color image of each camera.

For example, a method described in Non Patent Document 1 or the like can be adopted as a method of generating 3D data in the image processing unit. The image processing unit supplies the 3D data to the encoding device 12.

The encoding device 12 includes a conversion unit 21, an encoding unit 22, a storage unit 23, and a transmission unit 24.

The conversion unit 21 of the encoding device 12 determines viewpoints of color images and viewpoints of depth images, the numbers of which correspond to predetermined numbers of viewpoints of color images to be generated and viewpoints of depth images to be generated. The number of viewpoints of color images to be generated may be different from or the same as the number of viewpoints of depth images to be generated. The number of viewpoints of color images to be generated and the number of viewpoints of depth images to be generated are determined according to, for example, a user input and a state of a transmission path between the encoding device 12 and the decoding device 13. Here, it is assumed that these numbers of viewpoints are smaller than the number of viewpoints of the multi-camera of the imaging device 11.

The conversion unit 21 generates external parameters and internal parameters of virtual cameras of the determined viewpoints of color images and the determined viewpoints of depth images. On the basis of the external parameter and the internal parameter of each virtual camera for color images, the conversion unit 21 generates color images in frame units, captured by each virtual camera, from the 3D data supplied in frame units from the imaging device 11. Furthermore, on the basis of the external parameter and the internal parameter of each virtual camera for depth images, the conversion unit 21 generates depth images corresponding to the color images in frame units, captured by each virtual camera, from the 3D data in frame units.

As a method of generating color images and depth images from 3D data, it is possible to adopt a method described in, for example, Masayuki Tanimoto, "Realizing the Ultimate Visual Communication," IEICE Technical Report, Communication Systems (CS), 110 (323), 73-78, 2010-11-25, or the like. The conversion unit 21 supplies the color images and the depth images of each virtual camera to the encoding unit 22. Furthermore, the conversion unit 21 supplies the storage unit 23 with the external camera parameter and the internal parameter of each virtual camera corresponding to each of the color images and the depth images, as virtual viewpoint information.

The encoding unit 22 encodes the color images and the depth images of each virtual camera supplied from the conversion unit 21. Advanced Video Coding (AVC), High Efficiency Video Coding (HEVC), or the like can be adopted as an encoding method. The encoding unit 22 supplies the storage unit 23 with an encoded stream obtained as a result of encoding.

The storage unit 23 stores the virtual viewpoint information supplied from the conversion unit 21 and the encoded stream supplied from the encoding unit 22.

The transmission unit 24 reads the virtual viewpoint information and the encoded stream stored in the storage unit 23, and transmits the virtual viewpoint information and the encoded stream to the decoding device 13.

The decoding device 13 includes a receiving unit 31, a decoding unit 32, a reconstruction unit 33, and a rendering unit 34. An external parameter and an internal parameter of a display viewpoint are input to the decoding device 13 by a user viewing the display device 14, and are supplied to the reconstruction unit 33 and the rendering unit 34, as display viewpoint information.

The receiving unit 31 of the decoding device 13 receives the virtual viewpoint information and the encoded stream transmitted from the transmission unit 24 of the encoding device 12. The receiving unit 31 supplies the virtual viewpoint information to the reconstruction unit 33, and supplies the encoded stream to the decoding unit 32.

The decoding unit 32 decodes the encoded stream supplied from the receiving unit 31 in a method corresponding to the encoding method used in the encoding unit 22. The decoding unit 32 supplies the reconstruction unit 33 with color images and depth images of each virtual camera, obtained as a result of decoding.

The reconstruction unit 33 determines the priority of each virtual camera on the basis of the virtual viewpoint information and the display viewpoint information. The reconstruction unit 33 determines the numbers of viewpoints of color images and viewpoints of depth images to be used for creating a 3D model on the basis of resource information of the decoding device 13. The reconstruction unit 33 selects virtual cameras for color images, the number of which corresponds to the determined number of viewpoints of color images, as cameras selected for color images on the basis of the priority of each virtual camera for color images. Furthermore, the reconstruction unit 33 selects virtual cameras for depth images, the number of which corresponds to the determined number of viewpoints of depth images, as cameras selected for depth images on the basis of the priority of each virtual camera for depth images.

As with the image processing unit of the imaging device 11, the reconstruction unit 33 reconstructs 3D data by using the internal parameters and the external parameters of the cameras selected for color images and the cameras selected for depth images, included in the virtual viewpoint information, and using color images of the cameras selected for color images and depth images of the cameras selected for depth images. The reconstruction unit 33 supplies the 3D data to the rendering unit 34.

As with the conversion unit 21, the rendering unit 34 (generation unit) generates a color image from the display viewpoint, as a display image, from the 3D data supplied from the reconstruction unit 33 on the basis of the display viewpoint information, and supplies the display image to the display device 14.

The display device 14 includes a two-dimensional head-mounted display (HMD), a two-dimensional monitor, and the like. The display device 14 two-dimensionally displays a display image on the basis of the display image supplied from the reconstruction unit 33.

Note that the display device 14 may include a three-dimensional head-mounted display, a three-dimensional monitor, and the like. In such a case, as with the conversion unit 21, the rendering unit 34 generates a depth image from the display viewpoint from the 3D data on the basis of the display viewpoint information, and supplies the depth image to the display device 14. The display device 14 three-dimensionally displays a display image on the basis of the display image and the depth image supplied from the rendering unit 34.

Furthermore, while a 3D model is generated by calculation of a visual hull and the like in the example of FIG. 1, a 3D model may be generated by a point cloud. In such a case, 3D data include a three-dimensional position and color information of each point cloud, or a three-dimensional position of each point cloud and a color image of each camera.

(Configuration Example of Conversion Unit)

Figure 2:
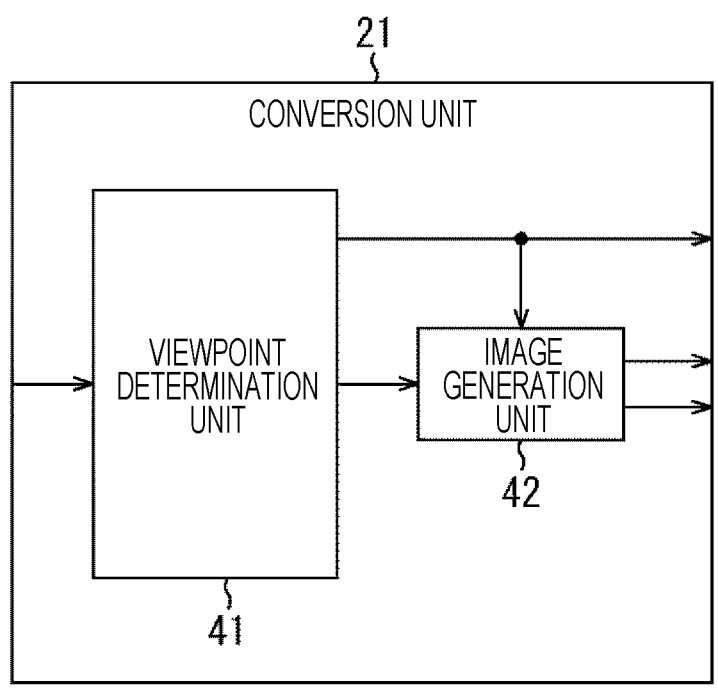
FIG. 2 is a block diagram showing a configuration example of a conversion unit.

FIG. 2 is a block diagram showing a configuration example of the conversion unit 21 in FIG. 1.

The conversion unit 21 in FIG. 2 includes a viewpoint determination unit 41 and an image generation unit 42.

The viewpoint determination unit 41 of the conversion unit 21 selects viewpoints, the number of which corresponds to the number of viewpoints of color images of a 3D model to be created, at regular intervals from among candidate viewpoints, and determines that the selected viewpoints be viewpoints of color images.

Furthermore, the viewpoint determination unit 41 determines viewpoints of depth images, the number of which corresponds to the number of viewpoints of depth images of a 3D model to be created, on the basis of a magnitude relationship between the number of viewpoints of color images and the number of viewpoints of depth images of the 3D model to be created and the 3D data supplied from the imaging device 11 in FIG. 1.

Specifically, in a case where the number of viewpoints of color images of a 3D model to be created is smaller than the number of viewpoints of depth images, the viewpoint determination unit 41 projects the 3D model onto a screen from each candidate viewpoint on the basis of the 3D data. Then, the viewpoint determination unit 41 calculates the distribution of the areas of regions on the screen, onto which respective polygon meshes forming the 3D model are projected. The viewpoint determination unit 41 selects viewpoints, the number of which corresponds to the number of viewpoints of depth images, in descending order of uniformity of distribution, and determines that the selected viewpoints be viewpoints of depth images.

This equalizes the areas of the regions on the screen from each of the determined viewpoints of depth images, onto which the polygon meshes are projected. As a result, in a case where a 3D model is created by a point cloud in the decoding device 13, it is possible to prevent occurrence of nonuniform density of the point cloud to improve the accuracy of 3D model geometry. Therefore, the viewpoints of depth images determined by the viewpoint determination unit 41 are viewpoints of depth images suitable for creation of a 3D model.

As described above, in a case where the number of viewpoints of color images is smaller than the number of viewpoints of depth images, a region of a 3D model represented by color images is smaller than a region of the 3D model represented by depth images. Therefore, viewpoints of depth images are determined in a manner to improve the accuracy of depth images. As a result, the 3D model can be reconstructed with high accuracy.

Furthermore, in a case where the number of viewpoints of color images of a 3D model to be created is larger than the number of viewpoints of depth images, the viewpoint determination unit 41 projects the 3D model onto a screen from each candidate viewpoint on the basis of the 3D data. Then, the viewpoint determination unit 41 finds the number of polygon meshes projected on the screen, on the basis of an ID or the like assigned to each polygon mesh forming the 3D model projected on the screen. The viewpoint determination unit 41 selects viewpoints, the number of which corresponds to the number of viewpoints of depth images, in descending order of number of polygon meshes projected on the screen, and determines that the selected viewpoints be viewpoints of depth images.

This reduces an occlusion region of each of the determined viewpoints of depth images. As a result, it is possible to improve the accuracy of 3D model geometry. Therefore, the viewpoints of depth images determined by the viewpoint determination unit 41 are viewpoints of depth images suitable for creation of a 3D model.

As described above, in a case where the number of viewpoints of color images is larger than the number of viewpoints of depth images, a region of a 3D model represented by color images is larger than a region of the 3D model represented by depth images. Therefore, viewpoints of depth images are determined in a manner to increase the region of the 3D model represented by depth images. As a result, the 3D model can be reconstructed with high accuracy.

Moreover, in a case where the number of viewpoints of color images is the same as the number of viewpoints of depth images, the viewpoint determination unit 41 determines that the viewpoints of color images be the viewpoints of depth images. Accordingly, the viewpoints of depth images are provided at regular intervals. Therefore, the viewpoints of depth images do not include a redundant viewpoint, and are thus suitable for creation of a 3D model.

The viewpoint determination unit 41 generates, as virtual viewpoint information, external parameters and internal parameters of the determined viewpoints of color images and the determined viewpoints of depth images, and supplies the virtual viewpoint information to the image generation unit 42 and the storage unit 23 in FIG. 1. Furthermore, the viewpoint determination unit 41 supplies the 3D data to the image generation unit 42.

The image generation unit 42 generates a color image from each viewpoint from the 3D data on the basis of the external parameter and the internal parameter of each viewpoint of a color image included in the virtual viewpoint information supplied from the viewpoint determination unit 41, and supplies the color image to the encoding unit 22 in FIG. 1. Furthermore, the image generation unit 42 generates a depth image from each viewpoint from the 3D data on the basis of the external parameter and the internal parameter of each viewpoint of a depth image included in the virtual viewpoint information, and supplies the depth image to the encoding unit 22.

Note that candidate viewpoints of color images and candidate viewpoints of depth images may be the same as or different from respective viewpoints of the multi-camera of the imaging device 11. In a case where candidate viewpoints of color images and candidate viewpoints of depth images are the same as the respective viewpoints of the multi-camera of the imaging device 11, this means that the conversion unit 21 has thinned color images and depth images obtained by the imaging device 11. Therefore, in such a case, transmission quantity can be reduced as compared with a case where the entire encoded stream of the color images and the depth images obtained by the imaging device 11 is transmitted to the decoding device 13. As a result, it is possible to improve the transmission speed of the encoded stream to generate a display image at a high frame rate in the decoding device 13.

(Description of Method of Determining Viewpoint of Depth Image)

Figure 3:
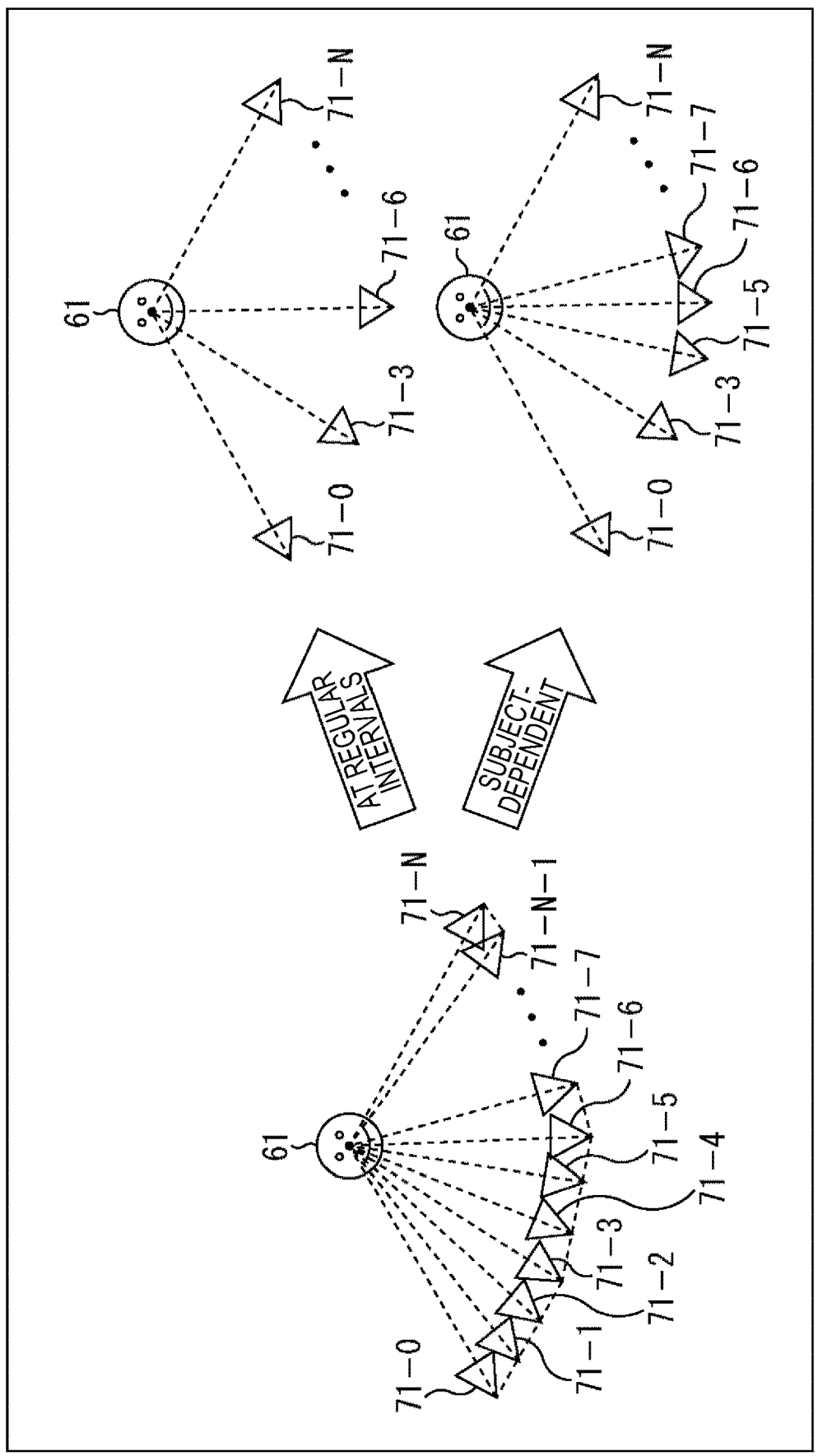
FIG. 3 is a diagram describing a method of determining viewpoints of depth images.

FIG. 3 is a diagram describing a method of determining viewpoints of depth images in a case where the number of viewpoints of color images is the same as the number of viewpoints of depth images.

In an example of FIG. 3, as shown on the left side of FIG. 3, virtual cameras corresponding to candidate viewpoints of depth images of a 3D model 61 are N+1 virtual cameras arranged at regular intervals, that is, virtual cameras 71-0 to 71-N (N is a multiple of 3).

In a case where the number of viewpoints of color images is the same as the number of viewpoints of depth images, the viewpoint determination unit 41 determines viewpoints of depth images from among viewpoints of the virtual cameras 71-0 to 71-N such that intervals between the respective viewpoints of the virtual cameras are equal, as with viewpoints of color images as shown in the upper right of FIG. 3. In the example of FIG. 3, the viewpoint determination unit 41 selects every third viewpoint of the virtual cameras 71-0 to 71-N, and determines that the selected viewpoints of the virtual camera 71-0, the virtual camera 71-3, the virtual camera 71-6, . . . , and the virtual camera 71-N be the viewpoints of depth images. In such a case, viewpoints with a narrow interval are not set as viewpoints of depth images. Therefore, the redundancy of viewpoints of depth images can be prevented.

Note that as shown in the lower right of FIG. 3, the viewpoint determination unit 41 may determine intervals between adjacent viewpoints of depth images on the basis of the 3D model 61, to determine viewpoints of depth images from among the viewpoints of the virtual cameras 71-0 to 71-N on the basis of the determined intervals.

In such a case, for example, the viewpoint determination unit 41 determines an interval between each viewpoint of a depth image in a manner to reduce an interval between a viewpoint where geometry of the 3D model 61 projected on the screen is complicated and a viewpoint adjacent to the viewpoint. In the example of FIG. 3, the geometry of the 3D model 61 projected on a screen from the viewpoint of the virtual camera 71-6 is the most complicated. Therefore, in the example of FIG. 3, the virtual cameras 71-4 to 71-6 are consecutively set as viewpoints of depth images.

Note that information to be used for determining an interval between adjacent viewpoints of depth images may be other than the complexity of the geometry of the 3D model 61 as long as the information indicates an important measure for a viewer. For example, on the basis of the degree of noticeability or the like of the 3D model 61 projected on the screen from each candidate viewpoint, the viewpoint determination unit 41 may determine an interval between each viewpoint of a depth image such that an interval between a viewpoint with a higher degree of noticeability and an adjacent viewpoint becomes narrower.

Furthermore, in a case where viewpoints of depth images are determined as shown in the lower right of FIG. 3, viewpoints of color images may be the same as the viewpoints of depth images, or may be viewpoints provided at regular intervals.

(Configuration Example of External Parameter)

FIG. 4 is a diagram showing a configuration example of external parameters included in the virtual viewpoint information.

As shown in FIG. 4, external parameters included in the virtual viewpoint information are configured such that a rotation matrix R and a position vector T, which are external parameters of a virtual camera, are associated with a camera ID of the virtual camera. The camera ID is an ID unique to each virtual camera for color images and each virtual camera for depth images. Note that although not shown, internal parameters included in the virtual viewpoint information are also configured in association with the camera IDs, as with the external parameters.

(Description of Processing by Encoding Device)

Figure 5:
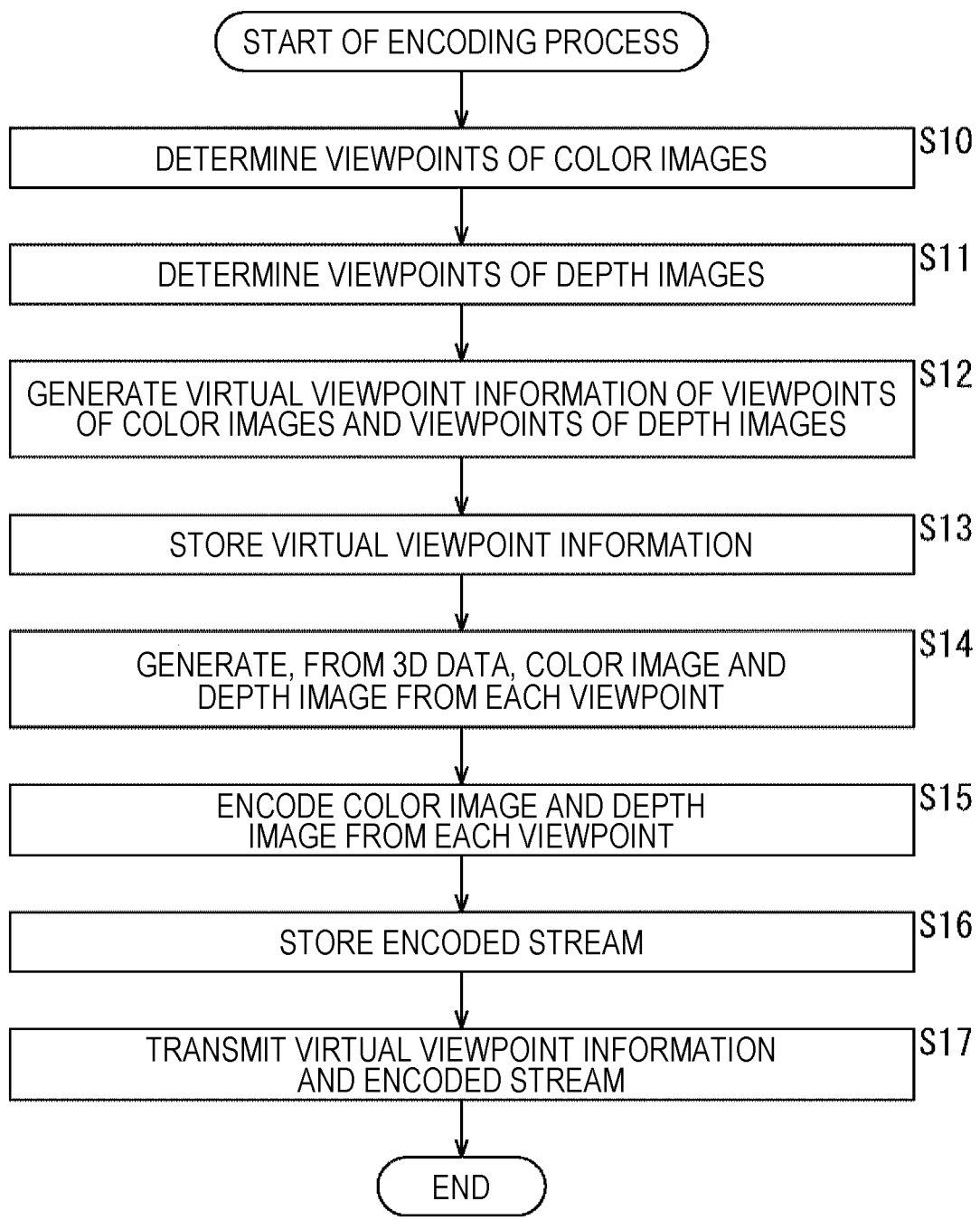
FIG. 5 is a flowchart describing an encoding process.

FIG. 5 is a flowchart describing an encoding process of the encoding device 12 in FIG. 1. The encoding process is started, for example, when 3D data are supplied from the imaging device 11 in frame units.

In step S10 of FIG. 5, the viewpoint determination unit 41 (FIG. 2) of the conversion unit 21 determines viewpoints of color images, the number of which corresponds to the number of viewpoints of color images to be generated, from among candidate viewpoints by a predetermined method.

In step S11, the viewpoint determination unit 41 determines viewpoints of depth images, the number of which corresponds to the number of viewpoints of depth images to be generated, on the basis of a magnitude relationship between the number of viewpoints of color images to be generated and the number of viewpoints of depth images to be generated and the 3D data supplied from the imaging device 11.

In step S12, the viewpoint determination unit 41 generates, as virtual viewpoint information, external parameters and internal parameters of the viewpoints of color images determined in step S10 and the viewpoints of depth images determined in step S11, and supplies the virtual viewpoint information to the image generation unit 42 and the storage unit 23. Furthermore, the viewpoint determination unit 41 supplies the 3D data to the image generation unit 42.

In step S13, the storage unit 23 stores the virtual viewpoint information supplied from the viewpoint determination unit 41.

In step S14, on the basis of the virtual viewpoint information supplied from the viewpoint determination unit 41, the image generation unit 42 generates, from the 3D data, a color image from each viewpoint determined in step S10 and a depth image from each viewpoint determined in step S11. The image generation unit 42 supplies the color image and the depth image from each viewpoint to the encoding unit 22.

In step S15, the encoding unit 22 encodes the color image and the depth image from each viewpoint supplied from the conversion unit 21. The encoding unit 22 supplies the storage unit 23 with an encoded stream obtained as a result of encoding.

In step S16, the storage unit 23 stores the encoded stream supplied from the encoding unit 22.

In step S17, the transmission unit 24 reads the virtual viewpoint information and the encoded stream stored in the storage unit 23, and transmits the virtual viewpoint information and the encoded stream to the decoding device 13. Then, the process is terminated.

Note that although the viewpoints of color images and depth images are changed frame by frame in an example of FIG. 5, an update interval of the viewpoints of color images and depth images is not limited to frame by frame.

As described above, the encoding device 12 determines that a candidate viewpoint be a viewpoint of a depth image of a 3D model on the basis of the 3D model projected on the screen from the candidate viewpoint. Accordingly, the encoding device 12 can select, from among candidate viewpoints, viewpoints of depth images suitable for creation of a 3D model. As a result, the encoding device 12 can transmit, to the decoding device 13, only depth images from the viewpoints suitable for creation of a 3D model. Therefore, the decoding device 13 can reduce a load of a process of creating a 3D model to improve the speed of creating the 3D model, by using the depth images to create the 3D model, as compared with a case of creating the 3D model by also using depth images not suitable for creation of a 3D model.

Note that the magnitude relationship between the number of viewpoints of color images to be generated and the number of viewpoints of depth images to be generated may be constant. In other words, the number of viewpoints of color images to be generated may be constantly larger than the number of viewpoints of depth images to be generated. Alternatively, the number of viewpoints of color images to be generated may be constantly smaller than the number of viewpoints of depth images to be generated.

(Configuration Example of Reconstruction Unit)

Figure 6:
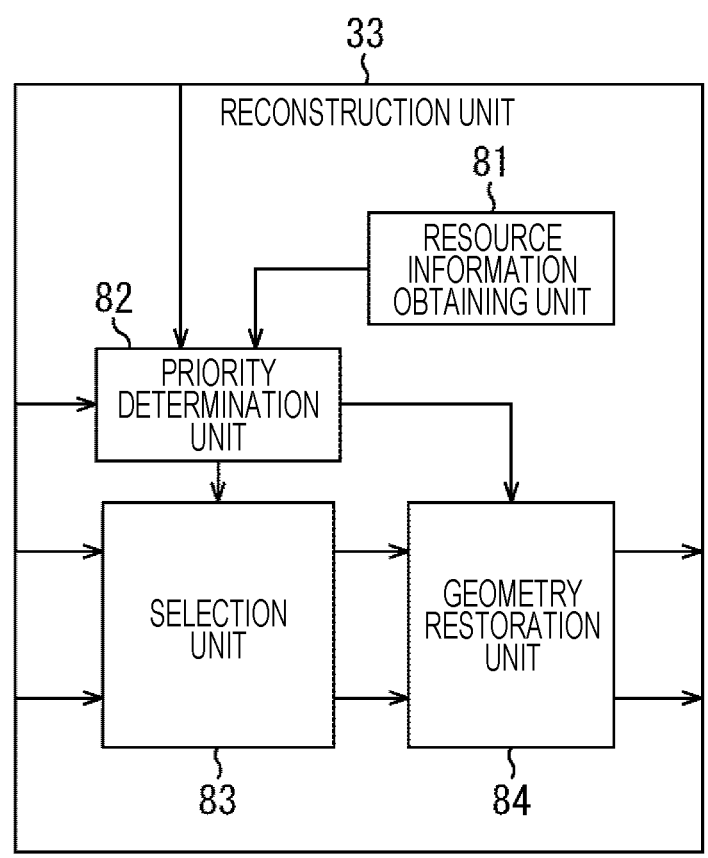
FIG. 6 is a block diagram showing a configuration example of a reconstruction unit.

FIG. 6 is a block diagram showing a configuration example of the reconstruction unit 33 in FIG. 1.

The reconstruction unit 33 in FIG. 6 includes a resource information obtaining unit 81, a priority determination unit 82, a selection unit 83, and a geometry restoration unit 84.

The resource information obtaining unit 81 of the reconstruction unit 33 obtains resource information, and supplies the resource information to the priority determination unit 82. The resource information indicates the load status of resources such as a central processing unit (CPU) and a graphics processing unit (GPU) that implement the reconstruction unit 33, the rendering unit 34, and the like of the decoding device 13.

The priority determination unit 82 determines the priority of each virtual camera on the basis of the virtual viewpoint information supplied from the receiving unit 31 in FIG. 1 and the display viewpoint information input to the decoding device 13. On the basis of the resource information supplied from the resource information obtaining unit 81, the priority determination unit 82 calculates data amounts of color images and depth images that can be used for real-time generation of 3D data. The priority determination unit 82 determines that the numbers of viewpoints of color images and viewpoints of depth images, corresponding to the data amounts, be the numbers of viewpoints of color images and viewpoints of depth images to be used for generating 3D data.

On the basis of the priority of each virtual camera for color images, the priority determination unit 82 selects virtual cameras for color images as cameras selected for color images, the number of which corresponds to the determined number of viewpoints of color images, in descending order of priority. Similarly, the priority determination unit 82 selects virtual cameras for depth images as cameras selected for depth images. The priority determination unit 82 supplies the selection unit 83 with camera IDs of the cameras selected for color images and the cameras selected for depth images, and supplies the geometry restoration unit 84 with the internal parameters and the external parameters.

Note that the number of cameras selected for color images is equal to or smaller than the total number of virtual cameras for color images, and the number of cameras selected for depth images is equal to or smaller than the total number of virtual cameras for depth images. In a case where the number of cameras selected for color images (cameras selected for depth images) is smaller than the total number of virtual cameras for color images (depth images), the selection unit 83 to be described below thins color images (depth images). The number of cameras selected for color images may be the same as or different from the number of cameras selected for depth images.

On the basis of the camera IDs of the cameras selected for color images, supplied from the priority determination unit 82, the selection unit 83 selects color images from viewpoints of the cameras selected for color images, from among the color images supplied from the decoding unit 32 in FIG. 1, and supplies the selected color images to the geometry restoration unit 84. On the basis of the camera IDs of the cameras selected for depth images, supplied from the priority determination unit 82, the selection unit 83 selects depth images from viewpoints of the cameras selected for depth images, from among the depth images supplied from the decoding unit 32, and supplies the selected depth images to the geometry restoration unit 84.

As with the image processing unit of the imaging device 11, the geometry restoration unit 84 reconstructs 3D data by using the internal parameters and the external parameters supplied from the priority determination unit 82, and the color images and the depth images supplied from the selection unit 83. The geometry restoration unit 84 supplies the 3D data to the rendering unit 34 in FIG. 1.

(Method of Determining Priority)

Figure 7:
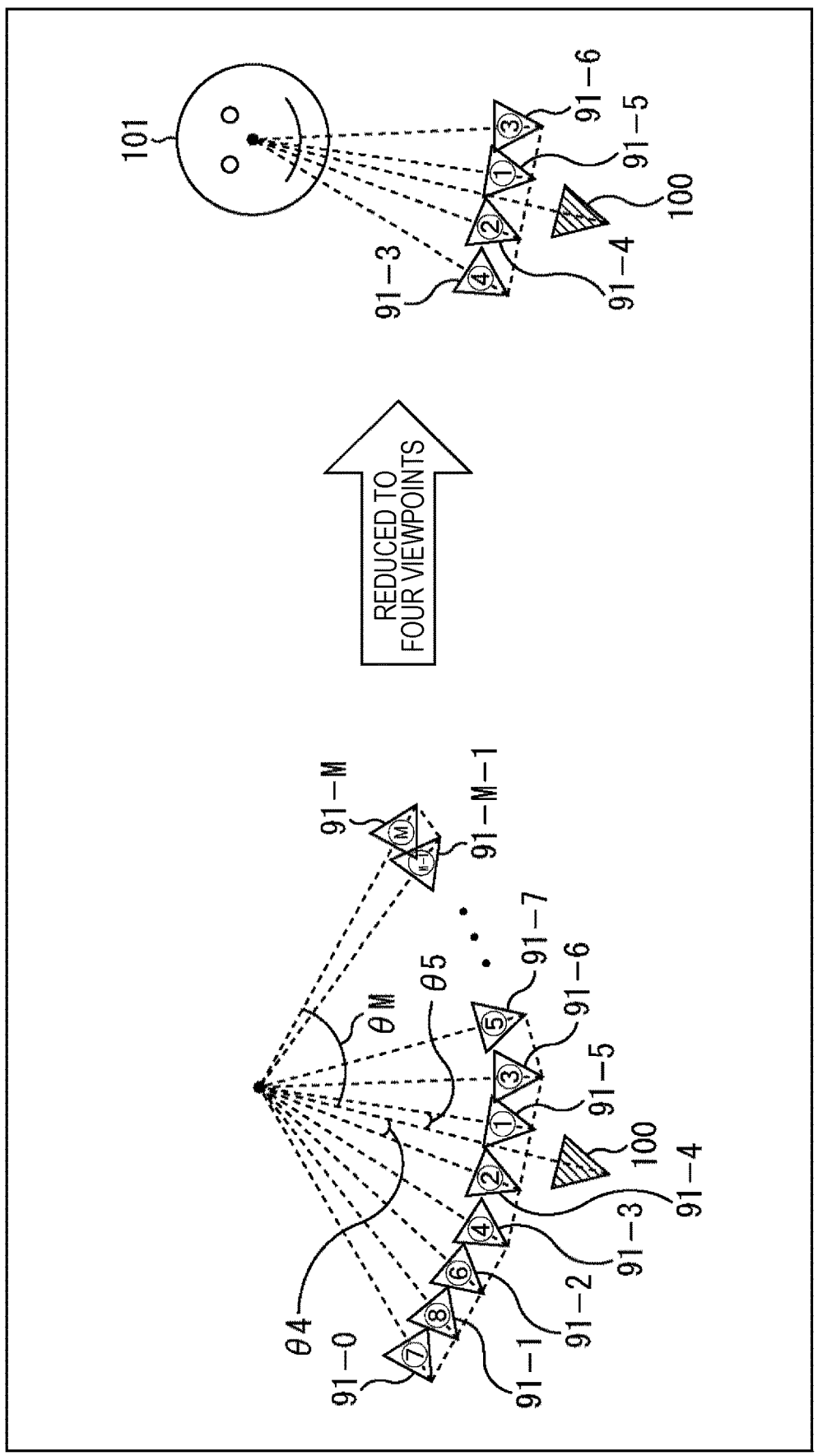
FIG. 7 is a diagram describing a method of determining the priority of virtual cameras for depth images.

FIG. 7 is a diagram describing a method of determining the priority of virtual cameras for depth images, to be performed by the priority determination unit 82 in FIG. 6.

In an example of FIG. 7, virtual cameras for depth images are M virtual cameras, that is, virtual cameras 91-0 to 91-M, and a virtual camera corresponding to the display viewpoint information is a virtual camera 100.

In this case, for example, as shown on the left side of FIG. 7, the priority determination unit 82 determines the priority of each of the virtual cameras 91-0 to 91-M such that higher priority is assigned to a virtual camera with a shooting angle closer to the shooting angle of the virtual camera 100. Accordingly, among the virtual cameras 91-0 to 91-M, the first priority is assigned to the virtual camera 91-5 positioned at the smallest angle, that is, at an angle of $\theta5$ to the virtual camera 100, and the second virtual priority is assigned to the virtual camera 91-4 positioned at the second smallest angle, that is, at an angle of θ4 to the virtual camera 100. Subsequently, assignment of priority is performed in a similar manner, and the M-th priority is assigned to the virtual camera 91-M positioned at the largest angle, that is, at an angle of θM to the virtual camera 100. Note that in FIG. 7, a triangle indicates a virtual camera, and a number in a triangle indicating a virtual camera indicates the priority of the virtual camera.

Here, when the priority determination unit 82 determines that four viewpoints of depth images be used for generating 3D data, on the basis of the resource information, virtual cameras having the first to fourth priority, that is, the virtual cameras 91-3 to 91-6 are selected as cameras selected for depth images, as shown on the right side of FIG. 7. As a result, 3D data of a 3D model 101 are reconstructed by use of only the virtual cameras 91-3 to 91-6. In this case, the sides and the back of the 3D model 101 cannot be reconstructed with high accuracy. However, this does not matter since the sides and the back thereof are not projected onto a display image.

Note that information to be used for determining priority is not limited to a shooting angle as long as the information indicates closeness to the virtual camera 100. For example, the priority determination unit 82 may determine the priority of each of the virtual cameras 91-0 to 91-M such that higher priority is assigned to a virtual camera closer to the position of the virtual camera 100, that is, a virtual camera located at a smaller Euclidean distance from the virtual camera 100. Furthermore, the priority determination unit 82 may determine the priority of the virtual cameras 91-0 to 91-M on the basis of both the shooting angles and the positions of the virtual cameras 91-0 to 91-M.

As described above, the priority determination unit 82 determines the priority of the virtual cameras 91-0 to 91-M such that higher priority is assigned to a virtual camera closer to the virtual camera 100 in terms of an angle to the virtual camera 100 or a Euclidean distance from the virtual camera 100. Therefore, the priority determination unit 82 can reconstruct the 3D model 101 by preferentially using a virtual camera that projects, onto a screen, a region of the 3D model 101 to be projected onto a display image. As a result, even in a case where the 3D model 101 cannot be reconstructed on a real-time basis by use of all the depth images corresponding to the encoded stream, it is possible to generate a high-quality display image on a real-time basis by use of the 3D model 101 partially reconstructed.

The priority of virtual cameras for color images is determined in the same manner as the priority of virtual cameras for depth images. In addition, cameras selected for color images are selected in the same manner as cameras selected for depth images. Therefore, further description will be omitted.

(Description of Processing by Decoding Device)

Figure 8:
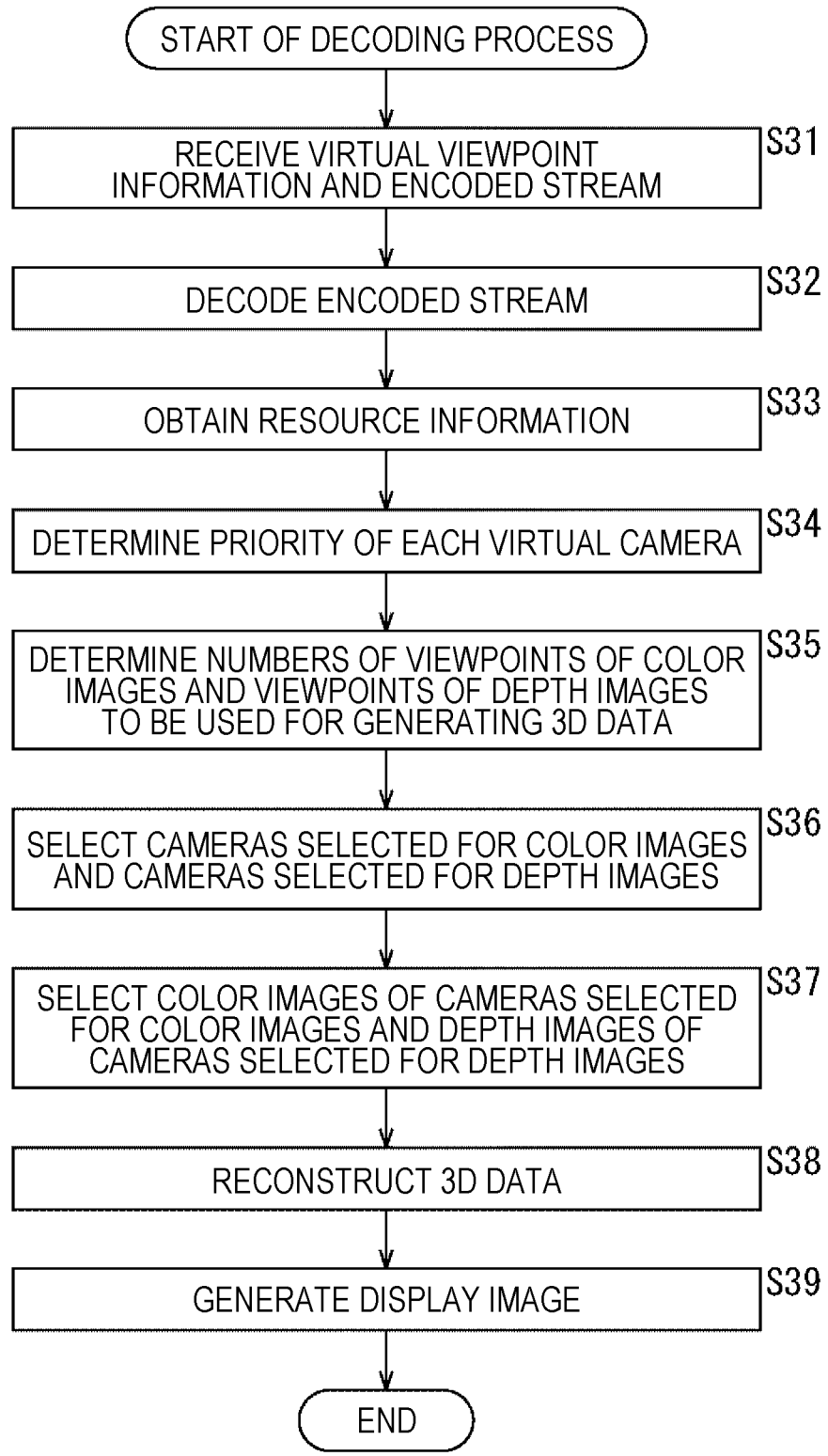
FIG. 8 is a flowchart describing a decoding process.

FIG. 8 is a flowchart describing a decoding process of the decoding device 13 in FIG. 1. The decoding process is started, for example, when an encoded stream and virtual viewpoint information are transmitted in frame units from the transmission unit 24 of the encoding device 12.

In step S31 of FIG. 8, the receiving unit 31 of the decoding device 13 receives the virtual viewpoint information and the encoded stream transmitted from the transmission unit 24. The receiving unit 31 supplies the virtual viewpoint information to the reconstruction unit 33, and supplies the encoded stream to the decoding unit 32.

In step S32, the decoding unit 32 decodes the encoded stream supplied from the receiving unit 31 in a method corresponding to the encoding method used in the encoding unit 22. The decoding unit 32 supplies the reconstruction unit 33 with color images and depth images of each virtual camera, obtained as a result of decoding.

In step S33, the resource information obtaining unit 81 (FIG. 6) of the reconstruction unit 33 obtains resource information, and supplies the resource information to the priority determination unit 82.

In step S34, the priority determination unit 82 determines the priority of each virtual camera on the basis of the virtual viewpoint information supplied from the receiving unit 31 and display viewpoint information input to the decoding device 13.

In step S35, on the basis of the resource information, the priority determination unit 82 determines that the numbers of viewpoints corresponding to data amounts of color images and depth images that can be used for real-time generation of 3D data, be the numbers of viewpoints of color images and viewpoints of depth images to be used for generating 3D data.

In step S36, on the basis of the priority of each virtual camera for color images, the priority determination unit 82 selects virtual cameras for color images as cameras selected for color images, the number of which corresponds to the number of viewpoints of color images determined in step S35, in descending order of priority. Similarly, the priority determination unit 82 selects virtual cameras for depth images as cameras selected for depth images. The priority determination unit 82 supplies the selection unit 83 with camera IDs of the cameras selected for color images and the cameras selected for depth images, and supplies the geometry restoration unit 84 with the internal parameters and the external parameters.

In step S37, on the basis of the camera IDs of the cameras selected for color images, supplied from the priority determination unit 82, the selection unit 83 selects color images of the cameras selected for color images, from among the color images supplied from the decoding unit 32, and supplies the selected color images to the geometry restoration unit 84. On the basis of the camera IDs of the cameras selected for depth images, supplied from the priority determination unit 82, the selection unit 83 selects depth images of the cameras selected for depth images, from among the depth images supplied from the decoding unit 32, and supplies the selected depth images to the geometry restoration unit 84.

In step S38, as with the image processing unit of the imaging device 11, the geometry restoration unit 84 reconstructs 3D data by using the internal parameters and the external parameters supplied from the priority determination unit 82, and the color images and the depth images selected in step S37. The geometry restoration unit 84 supplies the 3D data to the rendering unit 34.

In step S39, as with the conversion unit 21, the rendering unit 34 generates a color image from the display viewpoint, as a display image, from the 3D data supplied from the reconstruction unit 33 on the basis of the display viewpoint information, and supplies the display image to the display device 14. Then, the process is terminated.

As described above, on the basis of the display viewpoint information, the decoding device 13 selects depth images from predetermined viewpoints, from among depth images from a plurality of viewpoints corresponding to the encoded stream transmitted from the encoding device 12. Therefore, the decoding device 13 can select depth images from viewpoints suitable for creating a 3D model, which are used for generating a display image.

Furthermore, the decoding device 13 reconstructs a 3D model by using the selected depth images from the predetermined viewpoints. Therefore, for example, it is possible to thin depth images corresponding to the encoded stream to obtain depth images to be used for reconstructing a 3D model. Accordingly, it is possible to improve the processing speed of creation of a 3D model. As a result, a display image can be generated at a high frame rate.

Moreover, the decoding device 13 generates a display image by using the 3D model reconstructed by use of the selected depth images. Therefore, it is possible to generate a high-quality display image.

Second Embodiment (Description of Computer to Which Present Disclosure Has Been Applied)

A series of processes described above can be implemented by hardware, or can be implemented by software. In a case where the series of processes is implemented by software, a program included in the software is installed in a computer. Here, examples of the computer include a computer incorporated in dedicated hardware and a general-purpose personal computer or the like capable of performing various functions by installing various programs.

Figure 9:
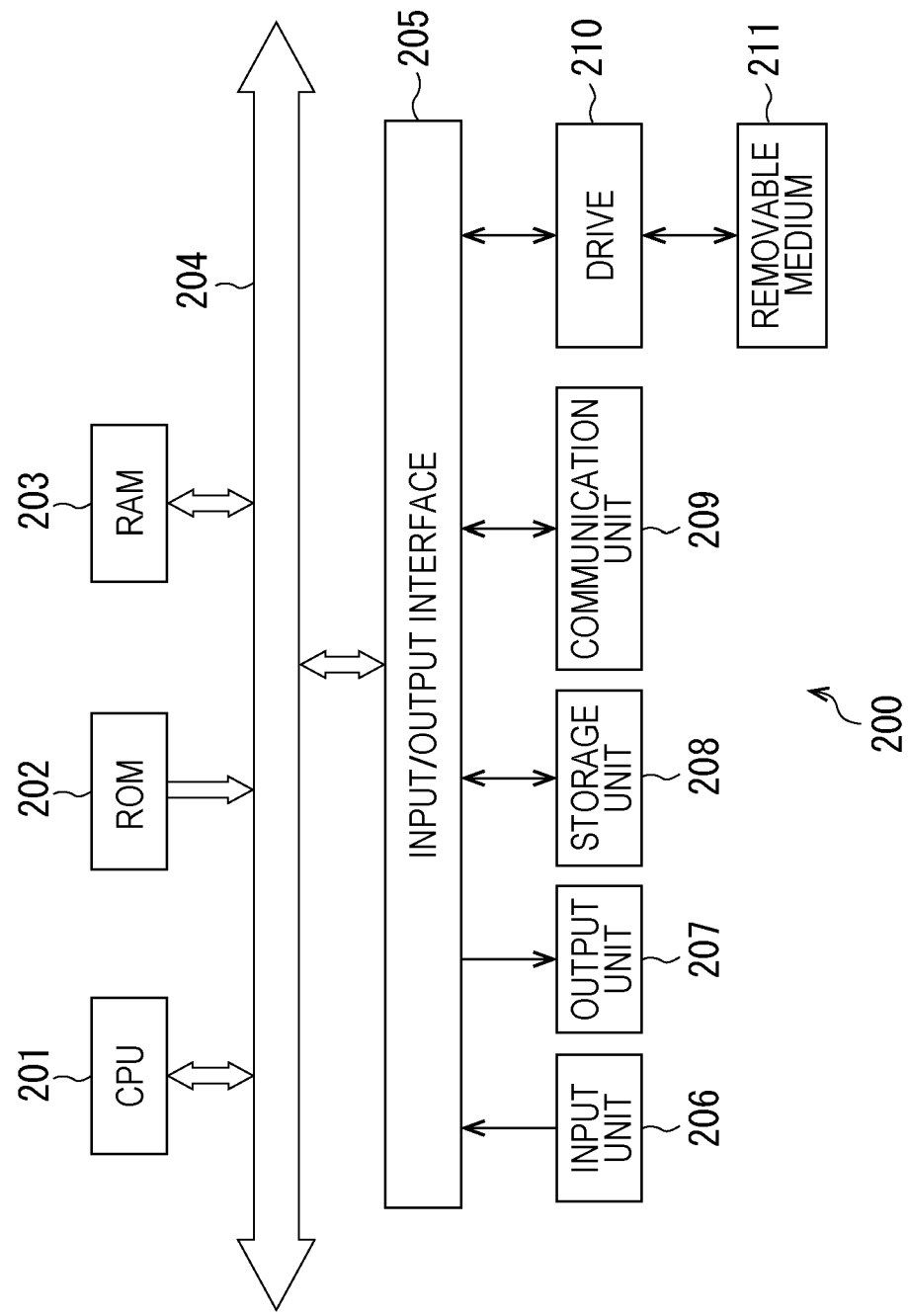
FIG. 9 is a block diagram showing a configuration example of hardware of a computer.

FIG. 9 is a block diagram showing a configuration example of hardware of a computer that performs the series of processes described above by means of a program.

In a computer 200, a central processing unit (CPU) 201, a read only memory (ROM) 202, and a random access memory (RAM) 203 are connected to one another via a bus 204.

The bus 204 is further connected to an input/output interface 205. The input/output interface 205 is connected to an input unit 206, an output unit 207, a storage unit 208, a communication unit 209, and a drive 210.

The input unit 206 includes a keyboard, a mouse, a microphone, and the like. The output unit 207 includes a display, a speaker, and the like. The storage unit 208 includes a hard disk, a nonvolatile memory, or the like. The communication unit 209 includes a network interface and the like. The drive 210 drives a removable medium 211 such as a magnetic disk, an optical disk, a magneto-optical disk, or a semiconductor memory.

In the computer 200 configured as described above, the CPU 201 loads a program stored in, for example, the storage unit 208 into the RAM 203 via the input/output interface 205 and the bus 204, and executes the program, so that the series of processes described above are performed.

A program to be executed by the computer 200 (CPU 201) can be recorded on, for example, the removable medium 211 as a package medium or the like, to be provided. Furthermore, the program can be provided via a wired or wireless transmission medium such as a local area network, the Internet, or digital satellite broadcasting.

In the computer 200, it is possible to install the program in the storage unit 208 via the input/output interface 205 by mounting the removable medium 211 on the drive 210. Furthermore, the program can be received by the communication unit 209 via a wired or wireless transmission medium, to be installed in the storage unit 208. In addition, the program can be installed in the ROM 202 or the storage unit 208 in advance.

Note that the program to be executed by the computer 200 may be a program that causes processes to be performed in chronological order in accordance with the order described in the present specification. Alternatively, the program may be a program that causes processes to be performed in parallel or at necessary timing such as timing when a call is made.

Application Example

The technique according to the present disclosure can be applied to various products. For example, the technique according to the present disclosure may be implemented as an apparatus to be mounted on any type of mobile object such as an automobile, an electric vehicle, a hybrid electric vehicle, a motorcycle, a bicycle, personal mobility, an airplane, a drone, a ship, a robot, a construction machine, or an agricultural machine (tractor).

FIG. 10 is a block diagram showing an example of a schematic configuration of a vehicle control system 7000 that is an example of a mobile object control system to which the technique according to the present disclosure can be applied. The vehicle control system 7000 includes a plurality of electronic control units connected via a communication network 7010. In the example shown in FIG. 10, the vehicle control system 7000 includes a drive system control unit 7100, a body system control unit 7200, a battery control unit 7300, a vehicle external information detection unit 7400, an in-vehicle information detection unit 7500, and an integrated control unit 7600. The communication network 7010 connecting a plurality of the control units may be, for example, an onboard communication network conforming to an arbitrary standard such as Controller Area Network (CAN), Local Interconnect Network (LIN), a local area network (LAN), or FlexRay (registered trademark).

Each control unit includes a microcomputer, a storage unit, and a drive circuit. The microcomputer performs arithmetic processing according to various programs. The storage unit stores the programs to be executed by the microcomputer, or parameters or the like to be used for various calculations. The drive circuit drives devices to be controlled in various control processes. Each control unit includes a network I/F for communicating with another control unit via the communication network 7010, and also includes a communication I/F for communicating with, for example, a device inside or outside a vehicle, or a sensor through wired communication or wireless communication. As a functional configuration of the integrated control unit 7600, FIG. 10 shows a microcomputer 7610, a general-purpose communication I/F 7620, a dedicated communication I/F 7630, a positioning unit 7640, a beacon receiving unit 7650, an in-vehicle device I/F 7660, a sound/image output unit 7670, an onboard network I/F 7680, and a storage unit 7690. Similarly, the other control units each include a microcomputer, a communication I/F, a storage unit, and the like.

The drive system control unit 7100 controls operation of a device related to a drive system of a vehicle according to various programs. For example, the drive system control unit 7100 functions as a control device for devices such as: a driving force generating device, such as an internal combustion engine or a driving motor, for generating driving force for a vehicle; a driving force transmission mechanism for transmitting driving force to wheels; a steering mechanism for adjusting the steering angle of the vehicle; and a braking device for generating braking force for the vehicle. The drive system control unit 7100 may have a function as a control device such as an antilock brake system (ABS) or an electronic stability control (ESC).

The drive system control unit 7100 is connected to a vehicle state detector 7110. For example, the vehicle state detector 7110 includes at least one of: a gyroscope sensor for detecting the angular velocity of the axis rotational motion of the body of a vehicle; an acceleration sensor for detecting the acceleration of the vehicle; or a sensor for detecting the operation amount of an accelerator pedal, the operation amount of a brake pedal, the steering angle of a steering wheel, engine speed, the rotational speed of a wheel, or the like. The drive system control unit 7100 performs arithmetic processing by using a signal input from the vehicle state detector 7110, and controls the internal combustion engine, the driving motor, an electric power steering device, a braking device, or the like.

The body system control unit 7200 controls operation of various devices mounted on the body of a vehicle according to various programs. For example, the body system control unit 7200 functions as a control device for a keyless entry system, a smart key system, a power window device, or various lamps such as a head lamp, a backup lamp, a brake lamp, a direction indicator, and a fog lamp. In this case, radio waves emitted from a portable device that substitutes for a key, or signals of various switches can be input to the body system control unit 7200. The body system control unit 7200 accepts the input of the radio waves or signals to control a door lock device, the power window device, the lamps, and the like of the vehicle.

The battery control unit 7300 controls a secondary battery 7310 that is a power supply source of the driving motor, according to various programs. For example, information is input to the battery control unit 7300 from a battery device including the secondary battery 7310. The information includes battery temperature, battery output voltage, battery remaining capacity, or the like. The battery control unit 7300 performs arithmetic processing by using these signals to control temperature regulation of the secondary battery 7310, or control a cooling device and the like provided in the battery device.

The vehicle external information detection unit 7400 detects information about the outside of a vehicle equipped with the vehicle control system 7000. For example, the vehicle external information detection unit 7400 is connected to at least one of an imaging unit 7410 or a vehicle external information detector 7420. The imaging unit 7410 includes at least one of a time-of-flight (ToF) camera, a stereo camera, a monocular camera, an infrared camera, or other cameras. The vehicle external information detector 7420 includes at least one of, for example, an environmental sensor for detecting current weather or weather conditions, or a surrounding information detection sensor for detecting another vehicle, an obstacle, a pedestrian, or the like around the vehicle equipped with the vehicle control system 7000.

The environmental sensor may be at least one of, for example, a raindrop sensor for detecting rainy weather, a fog sensor for detecting fog, a sunshine sensor for detecting the degree of sunshine, or a snow sensor for detecting a snowfall. The surrounding information detection sensor may be at least one of an ultrasonic sensor, a radar device, or a Light Detection and Ranging or Laser Imaging Detection and Ranging (LIDAR) device. Each of the imaging unit 7410 and the vehicle external information detector 7420 may be provided as an independent sensor or device, or may be provided as a device in which a plurality of sensors or devices has been integrated.

Here, FIG. 11 shows an example of installation positions of the imaging unit 7410 and the vehicle external information detector 7420. Imaging units 7910, 7912, 7914, 7916, and 7918 are provided at the position of at least one of, for example, a front nose, a side mirror, a rear bumper, a rear door, or an upper inner portion of a windshield of a vehicle 7900. The imaging unit 7910 provided at the front nose and the imaging unit 7918 provided at the upper inner portion of the windshield mainly obtain images of views ahead of the vehicle 7900. The imaging units 7912 and 7914 provided at the side mirrors mainly obtain images of views from the sides of the vehicle 7900. The imaging unit 7916 provided at the rear bumper or the rear door mainly obtains an image of a backward view from the vehicle 7900. The imaging unit 7918 provided at the upper inner portion of the windshield is mainly used for detecting a preceding vehicle, a pedestrian, an obstacle, a traffic signal, a traffic sign, a traffic lane, or the like.

Note that FIG. 11 shows an example of respective shooting ranges of the imaging units 7910, 7912, 7914, and 7916. An imaging range a indicates the imaging range of the imaging unit 7910 provided at the front nose. Imaging ranges b and c indicate the imaging ranges of the imaging units 7912 and 7914 provided at the respective side mirrors. An imaging range d indicates the imaging range of the imaging unit 7916 provided at the rear bumper or the rear door. For example, it is possible to obtain an overhead view image of the vehicle 7900 viewed from above, by superimposing image data of images captured by the imaging units 7910, 7912, 7914, and 7916.

Vehicle external information detectors 7920, 7922, 7924, 7926, 7928, and 7930, which are provided at the front, rear, sides, and corners of the vehicle 7900 and the upper inner portion of the windshield of the vehicle 7900, may be, for example, ultrasonic sensors or radar devices. The vehicle external information detectors 7920, 7926, and 7930, which are provided at the front nose, the rear bumper, the rear door, and the upper inner portion of the windshield of the vehicle 7900, may be, for example, LIDAR devices. The vehicle external information detectors 7920 to 7930 are mainly used for detecting a preceding vehicle, a pedestrian, an obstacle, or the like.

Returning to FIG. 10, description will be continued. The vehicle external information detection unit 7400 causes the imaging unit 7410 to capture an image of a view outside the vehicle, and receives image data of the captured image. Furthermore, the vehicle external information detection unit 7400 receives detection information from the vehicle external information detector 7420 connected thereto. In a case where the vehicle external information detector 7420 is an ultrasonic sensor, a radar device, or a LIDAR device, the vehicle external information detection unit 7400 causes the vehicle external information detector 7420 to emit ultrasonic waves, electromagnetic waves, or the like, and receives information of reflected waves received. On the basis of the received information, the vehicle external information detection unit 7400 may perform a process of detecting an object, such as a person, a car, an obstacle, a sign, or a character on a road surface, or a process of detecting the distance thereto. The vehicle external information detection unit 7400 may perform an environment recognition process for recognizing rainfall, fog, road surface conditions, or the like, on the basis of the received information. The vehicle external information detection unit 7400 may calculate the distance to an object outside the vehicle on the basis of the received information.

Furthermore, on the basis of the received image data, the vehicle external information detection unit 7400 may perform an image recognition process for recognizing a person, a car, an obstacle, a sign, a character on a road surface, or the like, or a process of detecting the distance thereto. The vehicle external information detection unit 7400 may perform a process of distortion correction, alignment, or the like on the received image data, and also combine the image data with image data of an image captured by another imaging unit 7410 to generate an overhead view image or a panoramic image. The vehicle external information detection unit 7400 may perform a viewpoint conversion process by using image data of an image captured by another imaging unit 7410.

The in-vehicle information detection unit 7500 detects information about the inside of the vehicle. The in-vehicle information detection unit 7500 is connected to, for example, a driver state detector 7510 that detects the state of a driver. The driver state detector 7510 may include a camera for capturing an image of a driver, a biological sensor for detecting biological information of the driver, a microphone for collecting sound inside the vehicle, or the like. The biological sensor is provided on, for example, a seating face, a steering wheel, or the like, and detects biological information of an occupant sitting on a seat or a driver holding the steering wheel. On the basis of detection information input from the driver state detector 7510, the in-vehicle information detection unit 7500 may calculate the degree of fatigue or the degree of concentration of the driver, or may determine whether or not the driver is dozing. The in-vehicle information detection unit 7500 may perform a process such as a noise-canceling process on sound signals of the collected sound.

The integrated control unit 7600 controls overall operation in the vehicle control system 7000 according to various programs. The integrated control unit 7600 is connected to an input unit 7800. For example, the input unit 7800 is implemented by a device, such as a touch panel, a button, a microphone, a switch, or a lever, that enables an occupant to perform an input operation. Data obtained by voice recognition of voice input through the microphone may be input to the integrated control unit 7600. The input unit 7800 may be, for example, a remote-control device using infrared rays or other radio waves, or may be an externally connected device, such as a mobile phone or a personal digital assistant (PDA), applicable to operation of the vehicle control system 7000. The input unit 7800 may be, for example, a camera. In such a case, an occupant can input information with gestures. Alternatively, data obtained by detection of the movement of a wearable device worn by an occupant may be input. Moreover, the input unit 7800 may include, for example, an input control circuit or the like that generates an input signal on the basis of information input by an occupant or the like by use of the above-described input unit 7800, and outputs the input signal to the integrated control unit 7600. An occupant or the like inputs various data or gives instructions for a processing operation to the vehicle control system 7000, by operating the input unit 7800.

The storage unit 7690 may include a read only memory (ROM) that stores various programs to be executed by a microcomputer, and a random access memory (RAM) that stores various parameters, calculation results, sensor values, or the like. Furthermore, the storage unit 7690 may be implemented by a magnetic storage device such as a hard disc drive (HDD), a semiconductor storage device, an optical storage device, a magneto-optical storage device, or the like.

The general-purpose communication I/F 7620 is a versatile communication I/F that mediates communication with various devices existing in an external environment 7750. The general-purpose communication I/F 7620 may implement a cellular communication protocol such as Global System of Mobile communications (GSM), WiMAX, Long Term Evolution (LTE), or LTE-Advanced (LTE-A), or another wireless communication protocol such as a wireless LAN (also referred to as Wi-Fi (registered trademark)) or Bluetooth (registered trademark). The general-purpose communication I/F 7620 may be connected to a device (for example, an application server or a control server) existing on an external network (for example, the Internet, a cloud network, or a company-specific network) via, for example, a base station or an access point. Furthermore, by use of, for example, peer-to-peer (P2P) technology, the general-purpose communication I/F 7620 may be connected to a terminal existing in the vicinity of the vehicle (for example, a terminal of a driver, a pedestrian, or a store, or a machine type communication (MTC) terminal).

The dedicated communication I/F 7630 is a communication I/F that supports a communication protocol formulated for use in a vehicle. For example, the dedicated communication I/F 7630 may implement a standard protocol such as Wireless Access in Vehicle Environment (WAVE), which is a combination of lower layer IEEE 802.11p and higher layer IEEE 1609, Dedicated Short Range Communications (DSRC), or a cellular communication protocol. Typically, the dedicated communication I/F 7630 performs V2X communication as a concept including one or more of vehicle-to-vehicle communication, vehicle-to-infrastructure communication, vehicle-to-home communication, and vehicle-to-pedestrian communication.

The positioning unit 7640 receives, for example, a GNSS signal from a Global Navigation Satellite System (GNSS) satellite (for example, a GPS signal from a Global Positioning System (GPS) satellite) to perform positioning, and generates positional information including the latitude, longitude, and altitude of the vehicle. Note that the positioning unit 7640 may determine a current location by exchanging signals with a wireless access point, or may obtain positional information from a terminal having a positioning function, such as a mobile phone, a PHS, or a smartphone.

For example, the beacon receiving unit 7650 receives radio waves or electromagnetic waves emitted from a radio station or the like provided on a road, to obtain information about a current location, traffic congestion, closure of a road, required time, or the like. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish a wireless connection by using a wireless communication protocol such as a wireless LAN, Bluetooth (registered trademark), Near Field Communication (NFC), or Wireless USB (WUSB). Furthermore, the in-vehicle device I/F 7660 may establish a wired connection, such as Universal Serial Bus (USB), High-Definition Multimedia Interface (HDMI), or Mobile High-definition Link (MHL), via a connection terminal (not shown) (and a cable, if necessary). The in-vehicle devices 7760 may include at least one of, for example, a mobile device or a wearable device that an occupant carries with him/her, or an information device to be carried in or attached to the vehicle. Furthermore, the in-vehicle devices 7760 may include a navigation device that performs a route search for any given destination. The in-vehicle device I/F 7660 exchanges control signals or data signals with the in-vehicle devices 7760.

The onboard network I/F 7680 is an interface that mediates communication between the microcomputer 7610 and the communication network 7010. The onboard network I/F 7680 transmits and receives signals and the like according to a predetermined protocol supported by the communication network 7010.

The microcomputer 7610 of the integrated control unit 7600 controls the vehicle control system 7000 according to various programs on the basis of information obtained via at least one of the general-purpose communication I/F 7620, the dedicated communication I/F 7630, the positioning unit 7640, the beacon receiving unit 7650, the in-vehicle device I/F 7660, or the onboard network I/F 7680. For example, the microcomputer 7610 may output a control command to the drive system control unit 7100 by calculating a control target value of the driving force generating device, the steering mechanism, or the braking device on the basis of obtained information about the inside and outside of the vehicle. For example, the microcomputer 7610 may perform cooperative control for the purpose of implementing an Advanced Driver Assistance System (ADAS) function including collision avoidance or shock mitigation of a vehicle, follow-up traveling based on a distance between vehicles, traveling at a constant vehicle speed, vehicle collision warning, warning of deviation from a vehicle lane, or the like. Furthermore, the microcomputer 7610 may perform cooperative control for the purpose of automatic driving or the like that enables a vehicle to autonomously travel without depending on driver's operation, by controlling the driving force generating device, the steering mechanism, the braking device, or the like on the basis of obtained information about the surroundings of the vehicle The microcomputer 7610 may generate information about three-dimensional distances between the vehicle and surrounding objects, such as structures and people, to create local map information including information about the surroundings of the current location of the vehicle on the basis of information obtained via at least one of the general-purpose communication I/F 7620, the dedicated communication I/F 7630, the positioning unit 7640, the beacon receiving unit 7650, the in-vehicle device I/F 7660, or the onboard network I/F 7680. Furthermore, on the basis of obtained information, the microcomputer 7610 may predict danger, such as collision of a vehicle, approach to a pedestrian or the like, or entry to a road closed to traffic, to generate a warning signal. The warning signal may be, for example, a signal for sounding an alarm, or turning on a warning lamp.

The sound/image output unit 7670 transmits an output signal of at least one of sound or an image to an output device capable of notifying information, visually or in an auditory manner, to an occupant of the vehicle or the outside of the vehicle. In the example of FIG. 10, an audio speaker 7710, a display unit 7720, and an instrument panel 7730 are shown as examples of the output device. The display unit 7720 may include at least one of, for example, an onboard display or a head-up display. The display unit 7720 may have an augmented reality (AR) display function. The output device may be another device than the above-described devices. Examples of the another device include a headphone, a wearable device such as a spectacle type display worn by an occupant, a projector, and a lamp. In a case where the output device is a display device, the display device visually displays results obtained by various processes performed by the microcomputer 7610 or information received from another control unit, in various formats such as a text, an image, a table, and a graph. Furthermore, in a case where the output device is an audio output device, the audio output device converts an audio signal including reproduced audio data, acoustic data, or the like into an analog signal, to output the analog signal in an auditory manner.

Note that in the example shown in FIG. 10, at least two control units connected via the communication network 7010 may be integrated as a single control unit. Alternatively, each control unit may include a plurality of control units. Moreover, the vehicle control system 7000 may include another control unit not shown. Furthermore, some or all of functions performed by any one of the control units in the above description may be performed by another control unit. That is, as long as information is transmitted and received via the communication network 7010, predetermined arithmetic processing may be performed by any one of the control units. Similarly, a sensor or device connected to any one of the control units may be connected to another control unit, and a plurality of the control units may transmit/receive detection information to/from each other via the communication network 7010.

Note that a computer program for implementing each function of the image processing system 10 according to the present embodiment described with reference to FIGS. 1 to 8 can be installed on any one of the control units or the like. Furthermore, it is also possible to provide a computer-readable recording medium storing such a computer program. Examples of the recording medium include a magnetic disk, an optical disk, a magneto-optical disk, a flash memory, and the like. Furthermore, the above-described computer program may be delivered via, for example, a network without use of a recording medium.

With respect to the vehicle control system 7000 described above, the image processing system 10 according to the present embodiment described with reference to FIGS. 1 to 8 can be applied to the vehicle control system 7000 of the application example shown in FIG. 10. For example, the imaging device 11 corresponds to the imaging unit 7410. The encoding device 12 and the decoding device 13 integrated with each other correspond to the integrated control unit 7600. The display device 14 corresponds to the display unit 7720.

Furthermore, at least some of the constituent elements of the encoding device 12 and the decoding device 13 described with reference to FIGS. 1 to 8 may be implemented in a module (for example, an integrated circuit module including a single die) for the integrated control unit 7600 shown in FIG. 10. Alternatively, the image processing system 10 described with reference to FIGS. 1 to 8 may be implemented by the plurality of control units of the vehicle control system 7000 shown in FIG. 10.

Moreover, in the present specification, the system refers to a set of a plurality of constituent elements (devices, modules (parts), and the like), and it does not matter whether or not all the constituent elements are in the same housing. Therefore, a plurality of devices housed in separate housings and connected via a network, and a single device including a plurality of modules housed in a single housing are both systems.

Note that the effects described in the present specification are merely illustrative and not restrictive, and other effects may be achieved.

Furthermore, the embodiments of the present disclosure are not limited to the above-described embodiments, and various modifications may be made without departing from the gist of the present disclosure.

For example, in the present disclosure, it is possible to adopt a configuration of cloud computing in which a plurality of devices shares a single function and performs processing in collaboration with each other via a network.

Furthermore, each step described in the above-described flowcharts can be performed by a single device, or can be shared and performed by a plurality of devices.

Moreover, in a case where a plurality of processes is included in a single step, the plurality of processes included in the single step can be performed by a single device, or can be shared and performed by a plurality of devices.

Note that the present disclosure can also adopt the following configurations.

(1)

An image processing apparatus including:

a viewpoint determination unit that determines that a candidate viewpoint be a viewpoint of a depth image of a 3D model on the basis of the 3D model projected on a screen from the candidate viewpoint.

(2)

The image processing apparatus according to (1) above, in which the viewpoint determination unit is configured to determine that the candidate viewpoint with higher uniformity of areas of regions on the screen, onto which respective polygons forming the 3D model are projected, be the viewpoint of a depth image in a case where a number of viewpoints of color images of the 3D model is smaller than a number of the viewpoints of depth images.

(3)

The image processing apparatus according to (1) or (2) above, in which the viewpoint determination unit is configured to determine that the candidate viewpoint with a larger number of polygons forming the 3D model projected on the screen, be the viewpoint of a depth image in a case where a number of viewpoints of color images of the 3D model is larger than a number of the viewpoints of depth images.

(4)

An image processing apparatus including:

a selection unit that selects a depth image from a predetermined viewpoint, from among depth images from a plurality of viewpoints of a 3D model, on the basis of a viewpoint of a display image; and a generation unit that generates the display image by using the depth image from the predetermined viewpoint, selected by the selection unit, and a color image of the 3D model.

(5)

The image processing apparatus according to (4) above, further including:

a priority determination unit that determines priority of each of the plurality of viewpoints on the basis of the viewpoint of the display image, in which the selection unit is configured to select the depth image from the predetermined viewpoint on the basis of the priority determined by the priority determination unit and resource information of the image processing apparatus.

(6)

The image processing apparatus according to (5) above, in which the priority determination unit is configured to determine the priority such that higher priority is assigned to a viewpoint closer to the viewpoint of the display image in terms of a position or angle.

(7)

The image processing apparatus according to any one of (4) to (6) above, in which the selection unit is configured to select a color image from a predetermined viewpoint, from among the color images from a plurality of viewpoints, and the generation unit is configured to generate the display image by using the depth image from the predetermined viewpoint and the color image from the predetermined viewpoint, selected by the selection unit.

(8)

An image processing method to be performed by an image processing apparatus, the method including:

a selection step of selecting a depth image from a predetermined viewpoint, from among depth images from a plurality of viewpoints of a 3D model, on the basis of a viewpoint of a display image; and a generation step of generating the display image by using the depth image from the predetermined viewpoint, selected in a process of the selection step, and a color image of the 3D model.

REFERENCE SIGNS LIST

12 Encoding device
13 Decoding device
34 Rendering unit
41 Viewpoint determination unit
82 Priority determination unit
83 Selection unit
91-0 to 91-M Virtual camera
100 Virtual camera
101 3D model

The invention claimed is:

1. An image processing apparatus comprising:
a selection unit configured to select a depth image from a prioritized depth image viewpoint, from among depth images from a plurality of depth image viewpoints of a 3D model, based on a display image viewpoint of a display image;
a generation unit configured to generate the display image by using the depth image from the prioritized depth image viewpoint selected by the selection unit and at least one color image of the 3D model,
wherein a number of the plurality of depth image viewpoints is reduced from a number of initially obtained depth image viewpoints, and
wherein the number of the plurality of depth image viewpoints is reduced and each respective depth image viewpoint of the reduced number of the plurality of depth image viewpoints is prioritized according to a relationship between the respective depth image viewpoint and at least one color image viewpoint used to obtain the at least one color image of the 3D model used to generate the display image; and
a priority determination unit configured to determine priority of each respective depth image viewpoint of the reduced number of the plurality of depth image viewpoints based on the display image viewpoint of the display image,
wherein the selection unit selects the depth image from the prioritized depth image viewpoint based on the priority of each respective depth image viewpoint of the reduced number of the plurality of depth image viewpoints determined by the priority determination unit and resource information of the image processing apparatus, and wherein the selection unit, the generation unit, and the priority determination unit are each implemented via at least one processor.

2. The image processing apparatus according to claim 1, wherein
the priority determination unit determines the priority such that higher priority is assigned to a depth image viewpoint closer to the display image viewpoint of the display image in terms of a position or an angle.

3. The image processing apparatus according to claim 1, wherein
the selection unit is further configured to select the at least one color image from the at least one color image viewpoint of the 3D model, from among color images from a plurality of color image viewpoints, and
the generation unit generates the display image by using the depth image from the prioritized depth image viewpoint and the at least one color image from the at least one color image viewpoint, selected by the selection unit.

4. The image processing apparatus according to claim 1, wherein
a relationship between the reduced number of the plurality of depth image viewpoints and a number of color image viewpoints is a magnitude relationship.

5. An image processing method to be performed by an image processing apparatus, the method comprising:
selecting a depth image from a prioritized depth image viewpoint, from among depth images from a plurality of depth image viewpoints of a 3D model, based on a display image viewpoint of a display image;
generating the display image by using the selected depth image from the prioritized depth image viewpoint and at least one color image of the 3D model,
wherein a number of the plurality of depth image viewpoints is reduced from a number of initially obtained depth image viewpoints, and
wherein the number of the plurality of depth image viewpoints is reduced and each respective depth image viewpoint of the reduced number of the plurality of depth image viewpoints is prioritized according to a relationship between the respective depth image viewpoint and at least one color image viewpoint used to obtain the at least one color image of the 3D model used to generate the display image; and
determining priority of each respective depth image viewpoint of the reduced number of the plurality of depth image viewpoints based on the display image viewpoint of the display image,
wherein the depth image from the prioritized depth image viewpoint is selected based on the priority of each respective depth image viewpoint of the reduced number of the plurality of depth image viewpoints and resource information of the image processing apparatus.

* * * * *